United States Patent
Baumann

(10) Patent No.: US 6,722,528 B2
(45) Date of Patent: Apr. 20, 2004

(54) ROTARY PNEUMATIC ACTUATOR

(75) Inventor: Hans D. Baumann, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 60 days.

(21) Appl. No.: 10/097,985

(22) Filed: Mar. 14, 2002

(65) Prior Publication Data

US 2003/0173533 A1 Sep. 18, 2003

(51) Int. Cl.[7] ............................................. F16K 31/44
(52) U.S. Cl. ...................... 222/14; 222/123.09; 222/279
(58) Field of Search ............................... 251/14, 123.09, 251/279

(56) References Cited

U.S. PATENT DOCUMENTS

| | | | | |
|---|---|---|---|---|
| 2,637,332 A | * | 5/1953 | Langworthy | 137/47 |
| 4,050,670 A | * | 9/1977 | Borg et al. | 251/14 |
| 4,285,493 A | * | 8/1981 | Willis | 251/14 |
| 4,573,661 A | * | 3/1986 | Chapman | 251/234 |
| 5,305,987 A | | 4/1994 | Baumann | 251/298 |
| 5,881,768 A | * | 3/1999 | Bezos et al. | 137/606 |
| 6,076,799 A | | 6/2000 | Baumann | 251/62 |
| 6,575,426 B2 | * | 6/2003 | Sundararajan | 251/14 |

* cited by examiner

Primary Examiner—Joseph A. Kaufman
(74) Attorney, Agent, or Firm—Lahive & Cockfield, LLP; Anthony A. Laurentano, Esq.; Sean D. Detweiler, Esq.

(57) ABSTRACT

A method and apparatus for translating linear movement into rotational movement in an actuator configuration is provided. For example, a rotary actuator assembly includes a housing having a central bore. A piston is disposed within the housing and is linearly movable along an axis of the central bore. A rolling diaphragm is disposed within the housing and coupled with the piston. A bifurcated linkage having an end flange couples with the piston and the rolling diaphragm. An articulatable coupling further connects the bifurcated linkage with a rotating linkage. A spring button, which can be cone shaped, is disposed within the housing. A compression spring is retained between the end flange of the bifurcated linkage and the spring button, for example, by a threaded rod and nut. The assembly is arranged such that when force is applied to the rolling diaphragm the bifurcated linkage is linearly transported, which results in the pivoting of the rotating linkage about a pivot point. The pivot point can couple to a valve stem to control a valve.

25 Claims, 7 Drawing Sheets

ROTARY PNEUMATIC ACTUATOR

FIELD OF THE INVENTION

The present invention relates to an actuator, and more particularly to an actuator that can produce an optimum torque output within a given weight and size envelope, and transmit the torque to a rotating shaft without lost motion or backlash.

BACKGROUND OF THE INVENTION

It is conventional in the use of rotationally actuated valves, such as rotary plug valves and butterfly valves, to employ an actuator that resolves a linear actuator translation into a rotational moment. This rotational force is utilized to open and close a valve gate or valve plug. An example rotary valve is shown and described in U.S. Pat. No. 6,076,799 to Baumann (Baumann '799). In Baumann '799, a linkage is provided at the end of a rotary valve shaft. The linkage inter-connects with a linear actuating device. Such actuators often include large mechanical housings that receive air and execute translation of the linear actuator component by interaction with a rolled diaphragm that moves in response to applied pressure. The housing is supported relative to the valve casing by a large framework that provides room for the linkages to operate internally.

The above-mentioned valve actuator requires a relatively large amount of space around the actual valve casing for the actuator mechanism. In some instances, it is desirable to have a smaller actuator mechanism that is simplified, relatively light weight, efficient, can be disassembled with ease and without causing a safety hazard, and is reversible with disassembly or additional parts.

Furthermore, it is known that actuator linkages that resolve linear transaction into rotational movement are often prone to backlash and/or may be difficult to assemble onto a shaft. A conventional approach is for rotary valve shafts to have a square cross section to provide edges for an actuator to grab on to for translation of rotary motion. However, square cross sections have a tendency to create backlash if the linkage is not accurately sized to the shaft. If the square cross section is disposed in a linkage that is not relatively close in size, the square shaft may begin to rotate within the linkage, causing backslash and eventually excessive wear. Some solutions make use of set screws or complicated clamps to increase the strength of the coupling between the linkage and the shaft. However, these structures add to the complexity of the interconnection between components, and therefore increase cost and assembly time for valves using such actuators.

SUMMARY OF THE INVENTION

There is a need for a rotary pneumatic actuator that can translate linear movement into rotational movement without loss of motion, or backlash. The actuator must also be relatively lightweight, simple in construction and use, efficient in the transmission of torque, and be reversible in direction of rotation without disassembly or additional parts. The present invention is directed towards further solutions to address these needs.

In accordance with one example embodiment of the present invention, a rotary actuator assembly includes a housing having a central bore with a first end and a second end. A piston is disposed within the housing and is linearly movable along an axis of the central bore. A rolling diaphragm is disposed within the housing and coupled with the piston. A bifurcated linkage having an end flange couples with the piston and the rolling diaphragm. An articulatable coupling further connects the bifurcated linkage with a rotating linkage. A spring button, which can be cone shaped, is disposed within the housing. A compression spring is retained between the end flange of the bifurcated linkage and the spring button, for example, by a threaded rod and nut. The assembly is arranged such that when force is applied to the rolling diaphragm the bifurcated linkage is linearly transported, which results in the pivoting of the rotating linkage about a pivot point. The pivot point can couple to a valve stem.

The rotary actuator can further include a strip flange coupled with the first end of the central bore and arranged to support the cone shaped spring button. In addition, a cast cup can be disposed at the second of the central bore sealingly engaged with the rolling diaphragm. A lower housing can be provided having a bore offset and perpendicular to the central bore.

In accordance with further aspects of the present invention, a slotted sleeve can be provided that is suitable for receiving a valve shaft. The slotted sleeve is disposed at the pivot point on the rotating linkage distal from the articulatable coupling. The slotted sleeve can have a broached interior.

In accordance with yet another aspect of the present invention, the rotating linkage can be bifurcated, having arms that straddle arms extending from the bifurcated linkage.

In accordance with still another aspect of the present invention, articulatable coupling can take the form of a bushing snapped into a bore and held in place with a riveted pin. In one configuration, arms extended from the bifurcated linkage can elastically deform toward each other, enabling the riveted pin to engage the bushing.

In accordance with still another aspect of the present invention, the actuator can further include a flat flange disposed at the first end of the central bore. There can be a bore disposed within the flat flange. A hand wheel can also be provided having a hollow hub. The hollow hub passes through the bore of the flat flange. The hollow hub, according to one aspect, is slidingly engaged with a nut that is threadingly engaged with a threaded rod and a thrust bearing. The thrust bearing is disposed on the strip flange. Rotation of the hand wheel can rotate the nut about the threaded rod. This action imparts tension on the threaded rod, thereby pulling the threaded rod together with the bifurcated linkage and compressing the compression spring to pivot the rotating linkage about the pivot point. The hollow hub, according to one aspect of the present invention, is formed of a substantially transparent material enabling observation of a position of the threaded rod.

According to further aspects of the present invention, the actuator can include a locking nut suitable for locking the hand wheel to prevent hand wheel rotation. In addition, a position feedback mechanism can be provided that is suitable for indicating a position of the bifurcated linkage within the housing. An inflation cavity can be formed by a cast cup sealingly engaged with the rolling diaphragm. An air passage can be provided between the inflation cavity and a positioning device, the air passage being disposed internal to the housing, thus eliminating the need for heretofore used cumbersome external pipes or tubing.

In accordance with further aspects of the present invention, a method of pneumatically activating a linkage to control a valve includes applying air pressure to an inflatable cavity formed by an end cap and a rolling diaphragm of a central bore in a housing. The inflatable cavity inflates to linearly move a piston and a bifurcated linkage disposed within the housing along an axis of the central bore while compressing a compression spring. The bifurcated linkage is articulatably coupled with a rotating linkage. The rotating linkage pivots in a first direction about a pivot point supporting a valve shaft coupling suitable for controlling rotation of the valve shaft to open or close a valve.

According to one aspect of the present invention, the method can further include deflating the inflatable cavity to recover spring force energy stored in the compression spring and pivot the rotating linkage in a second direction about the pivot point to open or close the valve.

In accordance with yet another aspect of the present invention, a method is provided of actuating a linkage to control a valve. The method begins with rotating a hand wheel in a first direction to rotate a nut that is threadingly engaged with a threaded rod, thereby imparting tension on the threaded rod. The threaded rod pulls together with a bifurcated linkage, linearly transporting the bifurcated linkage and compressing a compression spring. The linear transportation of the bifurcated linkage pivots a rotating linkage about a pivot point supporting a valve shaft coupling suitable for controlling rotation of the valve shaft to open or close the valve.

In accordance with yet another aspect of the present invention, the rotary actuator assembly is provided. The assembly includes a housing having a central bore with a first end and a second end. A bifurcated linkage articulatably couples with a rotating linkage. A rolling diaphragm is disposed within the housing and coupled with the bifurcated linkage. A compression spring is compressible by the bifurcated linkage. The described configuration operates in a manner such that when force is applied to the rolling diaphragm, the bifurcated linkage is linearly transported, which pivots the rotating linkage about a pivot point. A slotted sleeve is provided within the rotating linkage and is capable of receiving valve stems. The slotted sleeve is furthermore able to be elastically formed to tightly grip the valve stems and thereby prevent backlash.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
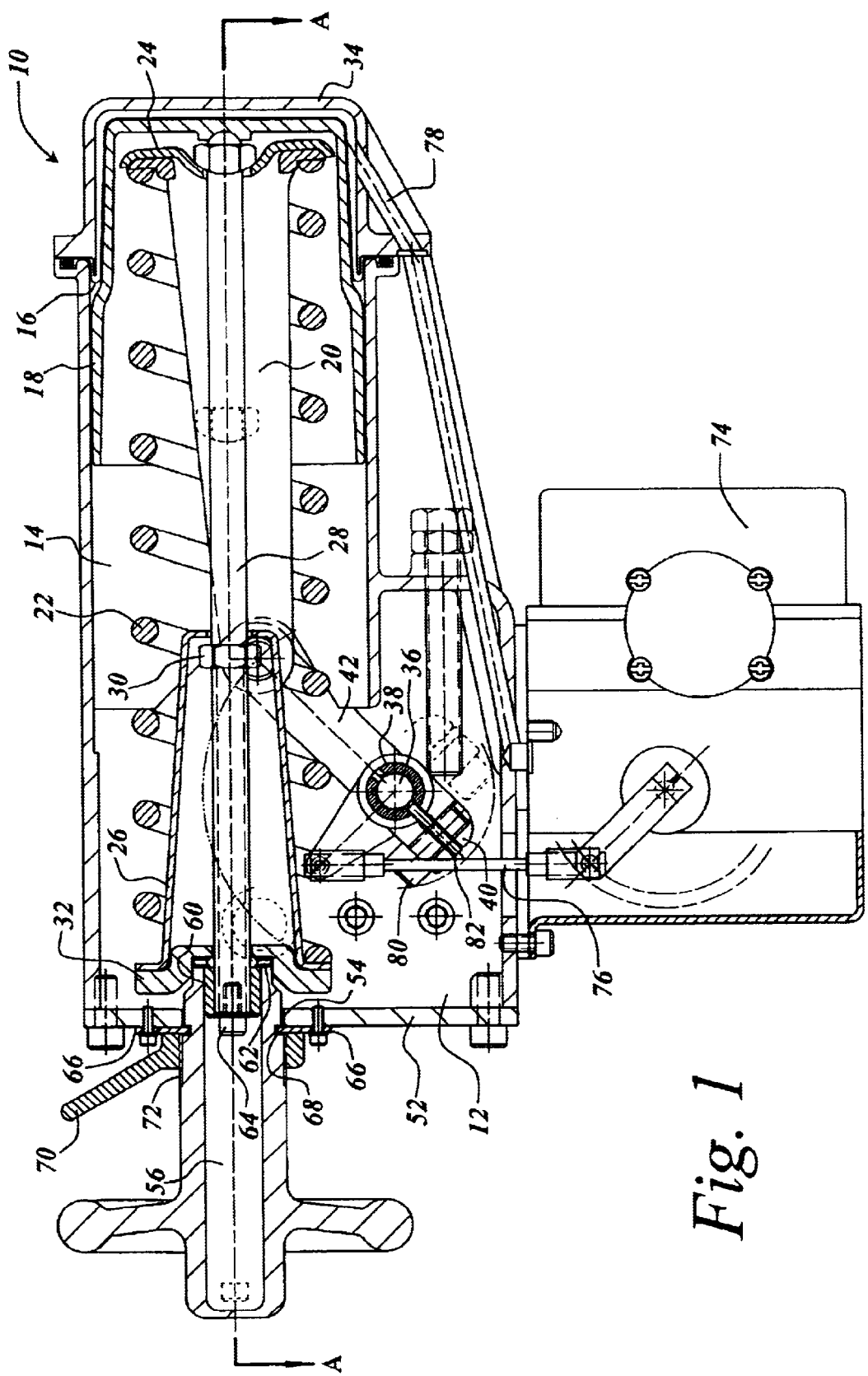
FIG. 1 is a diagrammatic illustration of a rotary pneumatic actuator according to one aspect of the present invention.

An illustrative embodiment of the present invention relates to a rotary pneumatic actuator having a cast housing with a central bore that houses a rolling diaphragm, a cup shaped piston, a bifurcated force transmission mechanism, and a compression spring. These elements are suitably retained between an end flange of the bifurcated force transmission mechanism and a cone shaped spring button by a threaded rod and a nut. The bifurcated force transmission mechanism converts a linear translation motion through an articulatable coupling with a rotating linkage to a rotational motion suitable for rotating a valve stem to open or close a valve. The transmission of torque can occur between the bifurcated force transmission mechanism and ultimately the valve stem, without loss motion or backlash. The rotary pneumatic actuator can be disassembled with ease and without creating a safety hazard to maintenance personnel. Additionally, the rotary pneumatic actuator can mount in different orientations to a valve to affect direction of rotation of the valve stem without disassembly or additional parts.

FIGS. 1 through 7, wherein like parts are designated by like reference numerals throughout, illustrate an example embodiment of a rotary pneumatic actuator according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 2:
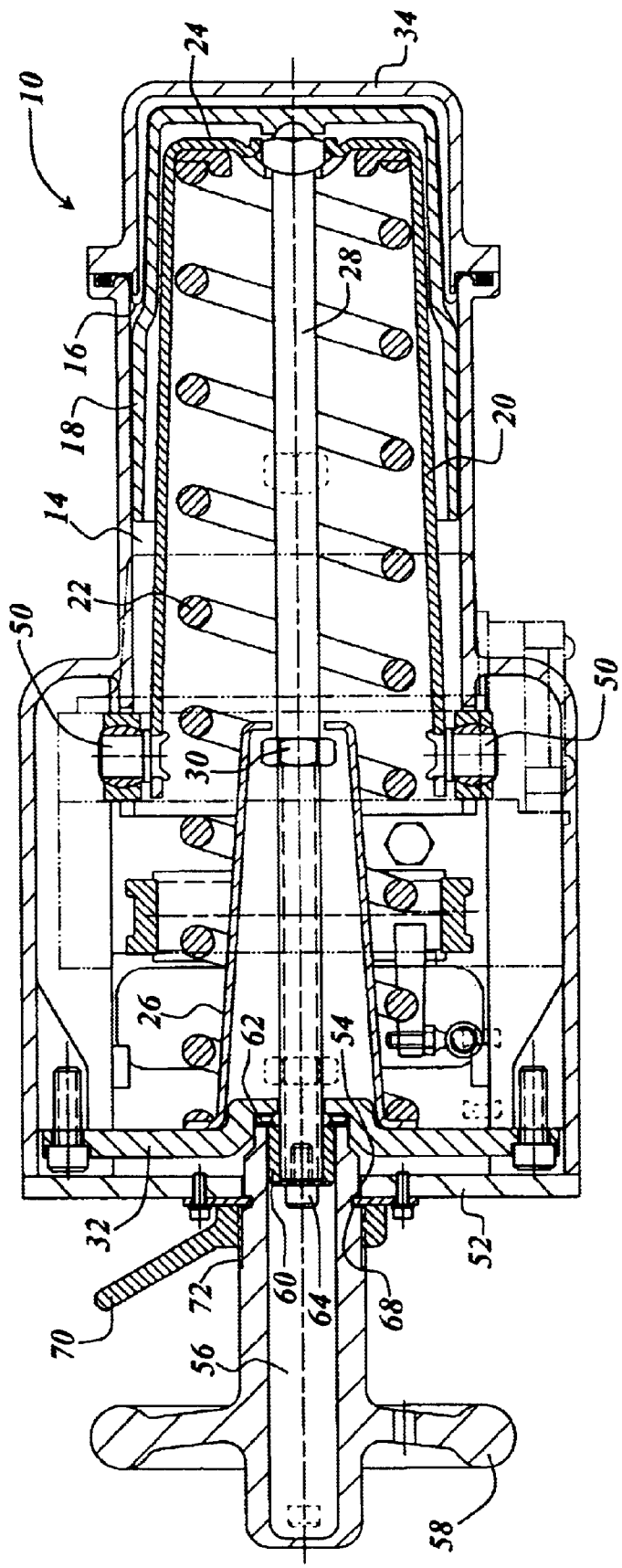
FIG. 2 is a cross-sectional top of the rotary pneumatic actuator of FIG. 1 according to one aspect of the present invention.

FIG. 1 illustrates a diagrammatic cross-section of an actuator 10, while FIG. 2 illustrates a top view cross-sectional diagrammatic illustration of the actuator 10, in accordance with aspects of the present invention. A housing 12 shields the inner workings of the actuator 10 and supports various elements within the actuator 10. The housing 12 can be formed of metal, plastic, composite, or other suitable material for the particular actuator application. A conventional material for forming the housing 12 is aluminum.

The housing 12 has a central bore 14 extending from a first end of the housing 12 to a second end of the housing 12. The central bore 14 extends substantially along a central axis A—A, as shown.

A rolling diaphragm 16 mounts at one end of the central bore 14. The rolling diaphragm 16 encompasses a piston 18, which is typically made of plastic. The rolling diaphragm 16 allows the piston 18 to slide in a linear translation motion along the central axis A—A.

A bifurcated force transmission mechanism 20 is also disposed within the housing 12 of the actuator 10 along the central bore 14. An end flange 24 of the bifurcated force transmission 20 holds a compression spring 22 in place between the end flange 24 and a conical spring button 26. A threaded rod 28 extends along a central axis A—A of the central bore 14 from the end flange 24 to an opposite end of the central bore 14. The threaded rod 28 includes a nut 30 disposed thereon. The nut 30 is suitable for adjusting compression of the compression spring 22 when the spring is in a substantially expanded position. A strip flange 32 further supports the conical spring button 26. The strip flange 32 fastens to one terminating end of the central bore 14. The other end of the central bore 14 has disposed thereon a cast cup 34, which also retains and seals the rolling diaphragm 16.

A lower portion of the housing 12 contains a valve stem bore 36, which is offset from, and perpendicular to, the central bore 14. The valve stem bore 36 maintains a slotted sleeve 38 having a broached interior (see FIG. 7) to receive valve stems or valve shafts 84 (see FIG. 6). The slotted sleeve 38 also passes through a clamp 40 of a rotating linkage 42 disposed within the housing 12.

The rotating linkage 42 articulatably couples with the bifurcated force transmission mechanism 20, such that two extending arms from the rotating linkage 42 straddle the extending arms of the bifurcated force transmission mechanism 20. Further detail concerning the articulatable coupling between the rotating linkage 42 and the bifurcated force mechanism 20, will be later described herein.

A flat flange 52 covers an end of the central bore 14 opposite the cast cap 34. The flat flange 52 is bolted onto the housing 12 and is removable while the actuator 10 is in operation. This feature allows some maintenance and/or diagnostic procedures to be performed on the actuator 10 because maintenance personnel can gain access to the interior of the actuator 10 while the actuator 10 is in operation.

The flat flange 52 includes a flat flange bore 54. A hollow hub 56 of a hand wheel 58 has a square cross-section and passes through the flat flange bore 54. The hollow hub 56 of the hand wheel 58 slidingly engages a square nut 60 otherwise engaging the threaded rod 28. The hollow hub 56 further engages a thrust bearing 62 located within a recess of the strip flange 32.

Rotation of the hand wheel 58 spins the square nut 60 and imparts tension on the threaded rod 28. This action pulls the threaded rod 28 together with the bifurcated force transmission mechanism 20, while compressing the compression spring 22, and ultimately rotating the rotating linkage 42. The rotation of the rotating linkage 42 causes rotation of the coupled valve stem or valve shaft 84. The hollow hub 56 can be formed of transparent plastic. The transparency of the hollow hub 56 has the advantage of allowing the observation of the position of a retaining screw 64 at the end of the threaded rod 28 as an indication of travel of the threaded rod 28 and the rotating linkage 42 within the actuator 10. The handwheel 58 is typically employed when there is a failure of actuating fluid, such as compressed air.

Two split washers 66 engaging a groove 68 and the housing 12 further secure the hand wheel 58. A locking nut 70 provides the option of locking the hand wheel 58 into a desired position when not in use. The locking nut 70 engages the hand wheel 58 at a hub threaded portion 72. Tightening of the locking nut 70 prevents unwanted rotation of the hand wheel 58.

A positioning device 74 is provided to supply air pressure through a drilled bore 78 to the rolling diaphragm 16 to effect mechanical movement of the bifurcated force transmission mechanism 20. The drilled bore 78 can be drilled or cast into the cast cup 34. The drilled bore 78 eliminates the need for exterior air tubing.

A mechanical feedback link 76 receives motion feedback from the rotating linkage 42. As the rotating linkage 42 rotates clockwise, the feedback link 76 moves upward. Correspondingly, as the rotating linkage 42 rotates counterclockwise, the feedback link 76 moves downward. This upward and downward motion can be translated into a measurable movement, against which position of the rotating linkage 42 can be mapped. The position of the rotating linkage 42 can then be correlated to a position of the valve stem 84, and thus the relative open or closed position of the valve to which the actuator 10 attaches.

It should be further noted that the flat flange 52 engaging the hollow hub 56 of the hand wheel 58 can be removed at will without danger to personnel, and even while the actuator 10 is operating. This allows for observation of the working parts and, if desired, for the removal of the internal working parts of the actuator 10 from the housing 12. Reversal of the actuator 10 is also possible to reverse direction of rotation of the valve stem. This is accomplished by inverting the actuator 10 180 degrees and reinserting the valve stem 84 into the valve stem bore 36 on the opposite side. This can be done once a bolt 80, used to clamp the split portion of the rotating linkage 42 on to the slotted sleeve 38, is loosened. It should further be noted that the rotating linkage 42 can accommodate a number of differently sized slotted sleeves 38 to fit a variety of valve and shaft sizes. A flat stamped key 82 is additionally inserted between the slotted portion of the rotating linkage 42 and the slotted sleeve 38 to provide additional locking action.

Figure 3:
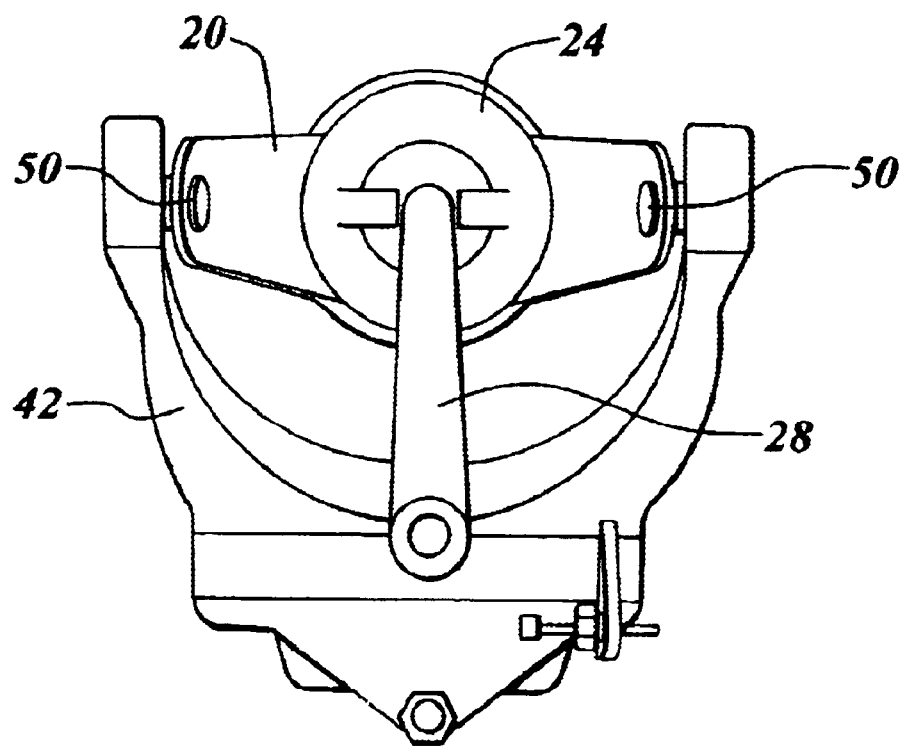
FIG. 3 is a perspective illustration of a linkage within the rotary pneumatic actuator according to one aspect of the present invention.
Figure 4:
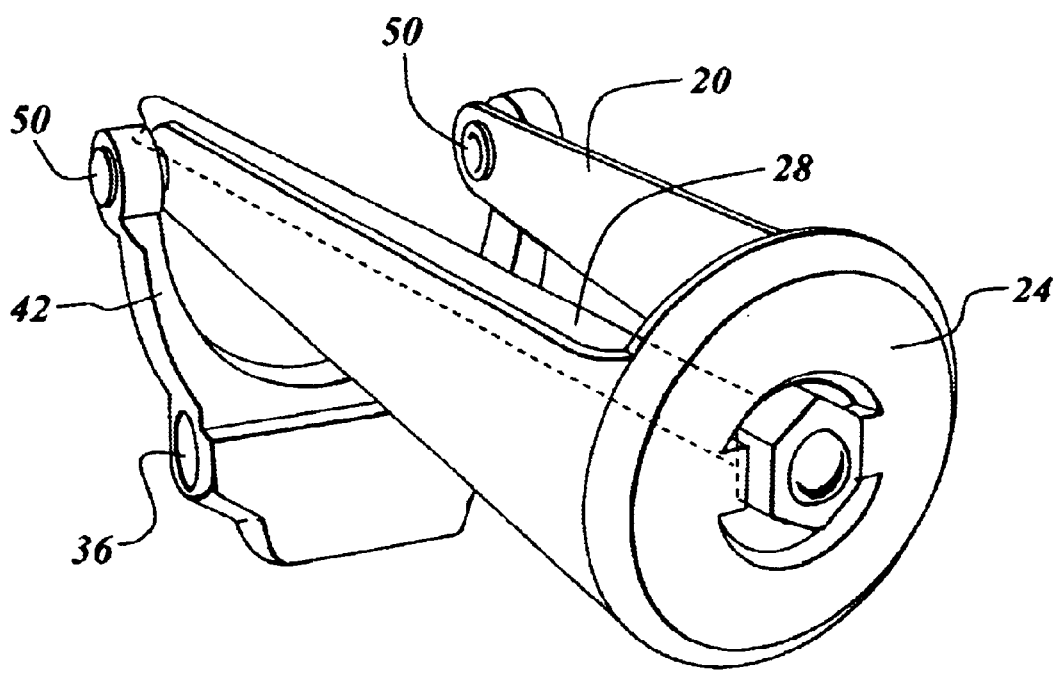
FIG. 4 is a perspective illustration of the linkage of FIG. 3 from a different view point according to one aspect of the present invention.

FIGS. 3 and 4 illustrate perspective views of the bifurcated force transmission mechanism 20 linked to the rotating linkage 42. A riveted pin 50 enables the articulatable coupling between the bifurcated force transmission mechanism 20 and the rotating linkage 42. The threaded rod 28 extends from the end flange 24 of the bifurcated force transmission mechanism 20. Meanwhile, it is plainly seen that the valve stem bore 36 is substantially perpendicular and offset relative to the threaded rod 28, which lines up along the central axis A—A when installed within the housing 12 of the actuator 10.

Figure 5:
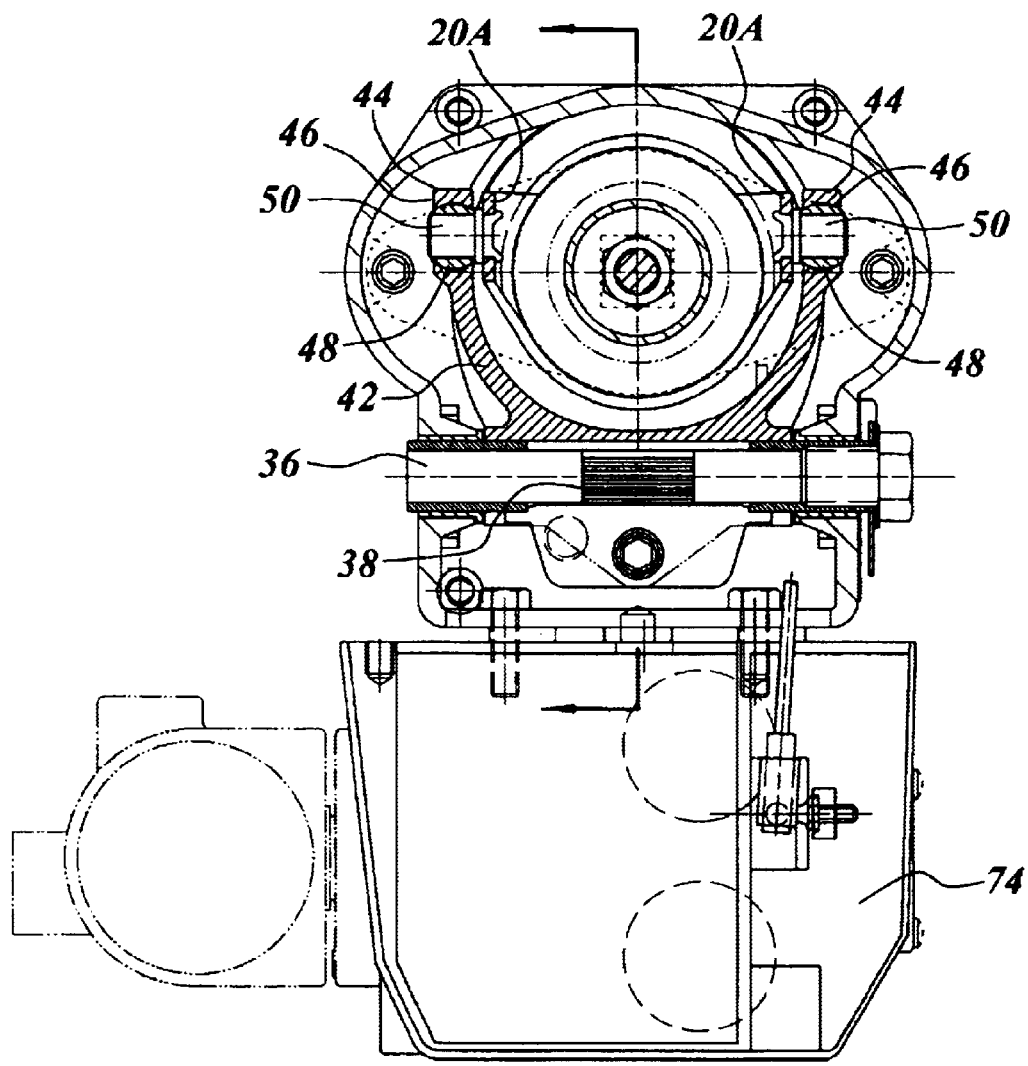
FIG. 5 is a cross-sectional end view of the rotary pneumatic actuator of FIG. 1 according to one aspect of the present invention.
Figure 6:
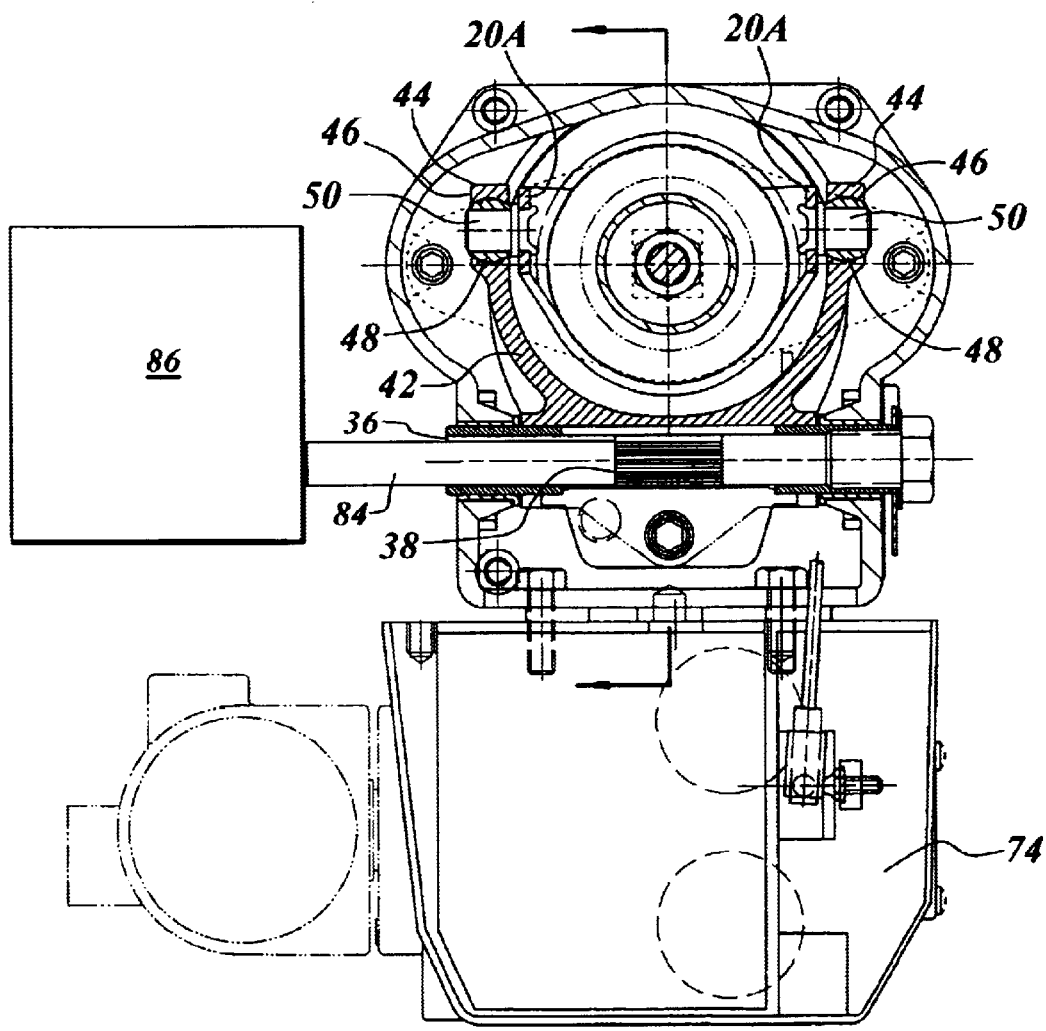
FIG. 6 is an additional cross-sectional end view of the rotary pneumatic actuator coupled with a valve according to one aspect of the present invention.

FIGS. 5 and 6 provide further detail on the actuator 10 in a cross-sectional sideview of the illustration in FIGS. 1 and 2. The rotating linkage 42 is shown having two bifurcated arms extending upward toward the articulatable coupling with the bifurcated force transmission mechanism 20. Rotating linkage arms 44 each contain a spherical bore 46 within a slotted guide bushing 48 whose outer periphery snugly fits the spherical bore 46 after being compressed to reduce the diameter and to allow each of the slotted guide bushings 48 to snap into place within the rotating linkage arms 44. Extended arm portions 20A of the bifurcated transmission mechanism 20 can elastically deform toward each other, such that upon assembly the riveted pin 50 located at the end of each extended arm portion 20A can engage each of the slotted guide bushings 48. The articulatable coupling is formed from the spherical bores 46, slotted guide bushings 48, and riveted pins 50. One of ordinary skill in the art will appreciate that other types and forms of hardware can combine to form articulatable couplings having substantially similar features to that of the present invention. Such other forms of articulatable couplings are intended to fall within the spirit and scope of the present invention.

Figure 7:
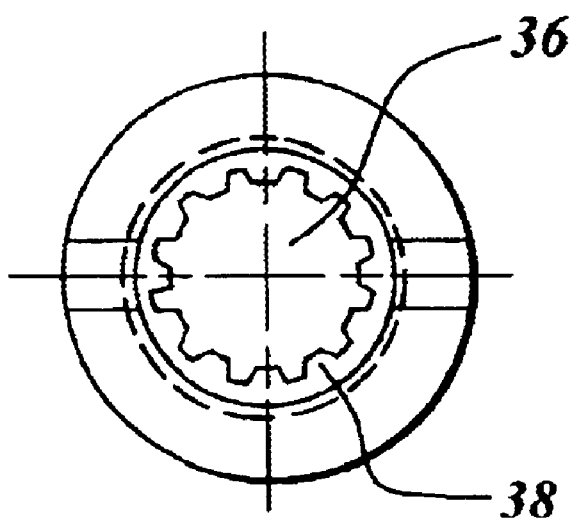
FIG. 7 is a cross-sectional illustration of a bore having a slotted sleeve suitable for receiving a valve stem according to one aspect of the present invention.

FIG. 6 further illustrates the valve stem bore 36 and the interior slotted sleeve 38 in relation to the rotating linkage 42. A valve stem 84 extending from a valve 86 passes through the valve stem bore 36 and engages with the slotted sleeve 38. FIG. 7 illustrates a cross-sectional view of the slotted sleeve 38 on the interior portion of the valve stem bore 36. The valve stem 84 can maintain ridges corresponding to the slotted sleeve 38 ridges, such that the ridges fit together to provide a snug fitting between the slotted sleeve 38 of the valve stem bore 36 and the valve stem 84 of the valve 86. The ridges, plus additional deformation due to clamping action of the bolt 80 of the sleeve 38 prevents loss of motion, or backlash, when the actuator 10 is controlling the valve 86 to open or close. One of ordinary skill in the art will appreciate that other internal sleeve configurations can be utilized to join the valve stem 84 to the valve stem bore 36.

Operation of the actuator 10 can be described as follows. The valve stem bore 36 and the slotted sleeve 38 receive the valve stem 84 of the valve 86 to be controlled. If the valve stem 84 slides into the slotted sleeve 38 from a first direction, the actuator 10 will rotate the valve stem 84 in a first direction (for example, clockwise) with the rotating linkage 42. It may be desired that the direction of rotation be opposite to that of the first direction of rotation. Consequently, the actuator 10 can be inverted 180 degrees, and the valve stem 84 mounted within the slotted sleeve 38 of the valve stem bore 36 from a second side to result in a second direction of rotation (for example, counterclockwise) during activation of the actuator 10.

The positioning device 74 provides an air signal through the drilled bore 78 to inflate a cavity formed by the rolling diaphragm 16 within the cast cup 34 of the housing 12. With increased air pressure, the rolling diaphragm 16 pushes the piston 18 along the central axis A—A of the central bore 14 within the housing 12 of the actuator 10. As the piston 18 moves along the central axis A—A, the end flange 24 of the bifurcated force transmission mechanism 20 compresses the compression spring 22 against the conical spring button 26. The threaded rod 28 guides the compression of the compression spring 22 toward the conical spring button 26.

As the bifurcated force transmission mechanism 20 translates linearly along the central axis A—A of the central bore 14, the articulatable coupling with the rotating linkage 42 translates the linear motion of the bifurcated force transmission mechanism 20 into a rotational motion of the rotating linkage 42. For example, as the bifurcated force transmission mechanism 20 slides toward the left side of FIG. 1, the rotating linkage 42 rotationally moves in the counter clockwise direction. This rotational movement results in the counter clockwise rotation of the valve stem bore 36, the slotted sleeve 38, and correspondingly the valve stem 84 of the valve 86. Rotational motion of the valve stem 84 causes the valve 86 to either open or close, depending on the configuration of the particular valve 86.

The mechanical feedback link 76 provides a mechanical indication of the position of the rotating linkage 42 within the actuator 10 as the bifurcated force transmission mechanism 20 moves to compress the compression spring 22. The mechanical feedback link 76 thus can result in an approximation of the valve position of the valve 86 attached to the actuator 10 once a correlation has been established.

The compression of the compression spring 22 builds spring force energy within the compression spring 22. Thus, as the positioning device 74 decreases the air pressure to the rolling diaphragm 16, the compression spring 22 translates the piston 18 in an opposite direction along the central axis A—A. The direction of the piston 18 mandates the direction of the bifurcated force transmission mechanism 20. Therefore, as the bifurcated force transmission mechanism 20 moves in an opposite direction, for example toward the right hand side of FIG. 1, the rotating linkage 42 moves in an opposite rotational direction, e.g., in the clockwise direction. This results in the valve stem bore 36, the slotted sleeve 38, and the coupled valve stem 84 moving in an opposite rotational direction, e.g., the clockwise direction, which results in the valve 86 doing the opposite of opening or closing than in the previous counter clockwise direction. The positioning device 74 can provide a negative pressure applied to the rolling diaphragm 16 to combine with the compression spring force of the expanding spring 22, if desired.

Should the positioning device 74, and corresponding elements, not be functional, the hand wheel 58 can provide manual control of the valve 86. As the hand wheel 58 is rotated in a first direction, the hollow hub 56 rotates the square nut 60 to pull the threaded rod 28 toward the hand wheel 58. This compresses the compression spring 22 and sets in motion the corresponding movement of the bifurcated force transmission mechanism 20 and the rotating linkage 42 as previously described. To reverse the direction of the rotation on the valve stem 84, the hand wheel 58 is rotated in a second direction, causing the compression spring 22 to expand as the threaded rod 28 moves in an opposite direction along the central axis A—A. The compression spring 22 pushes the end flange 24 of the bifurcated force transmission mechanism 20, resulting in the movement of the rotating linkage 42 in an opposite rotational direction. This correspondingly results in the valve stem 84 moving in an opposite direction to control the valve 86.

Thus, the present invention provides a rotary pneumatic actuator that can translate linear movement into rotational movement without loss of motion, or backlash. The articulatable coupling between the bifurcated force transmission mechanism 20 and the rotating linkage 42 efficiently converts linear translation motion into rotational motion. The actuator is also relatively lightweight as the simple construction performs the required tasks without complicated arrangements set screws, a plurality of linkages and pins, or the like. The articulatable coupling transmits the torque required to control valves attached to the actuator. Further, the direction of torque applied to the valves is reversible based on the orientation of the actuator when installed together with the valve. This results in an actuator that is easily reversible in direction of rotation without disassembly or additional parts.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A rotary actuator assembly, comprising:
    a housing having a central bore with a first end and a second end;
    a piston disposed within the housing and linearly movable along an axis of the central bore;
    a rolling diaphragm disposed within the housing and coupled with the piston to enable the piston to slide;
    a bifurcated linkage having an end flange coupled with the piston and the rolling diaphragm for translation of motion, the bifurcated linkage further having an articulatable coupling connecting the bifurcated linkage with a rotating linkage;
    a spring button disposed within the housing; and
    a compression spring retained between the end flange of the bifurcated linkage and the spring button;

wherein force applied to the piston and the rolling diaphragm linearly transports the bifurcated linkage and pivots the rotating linkage about a pivot point.

2. The rotary actuator of claim 1, further comprising a strip flange coupled with the first end of the central bore and arranged to support the spring button.

3. The rotary actuator of claim 2, further comprising a flat flange disposed at the first end of the central bore.

4. The rotary actuator of claim 3, further comprising a bore disposed within the flat flange.

5. The rotary actuator of claim 4, further comprising a hand wheel having a hollow hub, the hollow hub passing through the bore of the flat flange.

6. The rotary actuator of claim 5, wherein the hollow hub is slidingly engaged with a nut that is threadingly engaged with a threaded rod and a thrust bearing, the thrust bearing disposed on the strip flange.

7. The rotary actuator of claim 6, wherein rotation of the hand wheel rotates the nut about the threaded rod, imparting tension on the threaded rod, thereby pulling the threaded rod together with the bifurcated linkage and compressing the compression spring to pivot the rotating linkage about the pivot point.

8. The rotary actuator of claim 5, wherein the hollow hub is formed of a substantially transparent material enabling observation of a position of the threaded rod.

9. The rotary actuator of claim 5, further comprising a locking nut suitable for locking the hand wheel to prevent hand wheel rotation.

10. The rotary actuator of claim 1, further comprising a cast cup disposed at the second end of the central bore and sealingly engaged with the rolling diaphragm.

11. The rotary actuator of claim 1, further comprising a lower housing having a bore offset and perpendicular to the central bore.

12. The rotary actuator of claim 4, further comprising a slotted sleeve suitable for receiving a valve shaft, the slotted sleeve disposed at the pivot point on the rotating linkage distal from the articulatable coupling.

13. The rotary actuator of claim 12, wherein the slotted sleeve comprises a broached interior.

14. The rotary actuator of claim 1, wherein the rotating linkage is bifurcated and straddles arms extending from the bifurcated linkage.

15. The rotary actuator of claim 1, wherein the articulatable coupling comprises a bushing snapped into a bore and held in place with a riveted pin.

16. The rotary actuator of claim 12, wherein arms extending from the bifurcated linkage are elastically deformed toward each other, enabling the riveted pin to engage the bushing.

17. The rotary actuator of claim 1, further comprising a position feedback mechanism suitable for indicating a position of the bifurcated linkage within the housing.

18. The rotary actuator of claim 1, further comprising an inflation cavity formed by a cast cup sealingly engaged with the rolling diaphragm.

19. The rotary actuator of claim 18, further comprising an air passage between the inflation cavity and a positioning device, the air passage disposed internal to the housing.

20. The rotary actuator of claim 1, wherein the spring button comprises a cone shaped spring button.

21. The rotary actuator of claim 1, wherein the compression spring is retained between the end flange of the bifurcated linkage and the spring button by a threaded rod and nut.

22. A method of pneumatically actuating a linkage to control a valve, comprising:

applying air pressure to an inflatable cavity formed by an end cap of a central bore in a housing and a rolling diaphragm;

inflating the inflatable cavity to linearly move a piston and a bifurcated linkage disposed within the housing along an axis of the central bore while compressing a compression spring, the bifurcated linkage being articulatably coupled with a rotating linkage; and pivoting the rotating linkage in a first direction about a pivot point supporting a valve shaft coupling suitable for controlling rotation of a valve shaft to open or close the control valve.

23. The method of claim 22, further comprising deflating the inflatable cavity to recover spring force energy stored in the compression spring and pivot the rotating linkage in a second direction about the pivot point to open or close the valve.

24. A method of actuating a linkage to control a valve, comprising:

rotating a hand wheel in a first direction to rotate a nut threadingly engaged with a threaded rod thereby imparting tension on the threaded rod; and pulling the threaded rod together with a bifurcated linkage to linearly transport the bifurcated linkage and compress a compression spring;

wherein the linear transporting of the bifurcated linkage pivots a rotating linkage about a pivot point supporting a valve shaft coupling suitable for controlling rotation of a valve shaft to open or close the control valve.

25. A rotary actuator assembly, comprising:

a housing having a central bore with a first end and a second end;

a bifurcated linkage articulatably coupled with a rotating linkage;

a rolling diaphragm disposed within the housing and coupled with the bifurcated linkage; and a compression spring compressible by the bifurcated linkage;

wherein force applied to the rolling diaphragm linearly transports the bifurcated linkage and pivots the rotating linkage about a pivot point supporting a rotating shaft coupling.

* * * * *